(12) United States Patent
Neumann et al.

(10) Patent No.: US 9,472,022 B2
(45) Date of Patent: Oct. 18, 2016

(54) THREE-DIMENSIONAL POINT PROCESSING AND MODEL GENERATION

(71) Applicant: UNIVERSITY OF SOUTHERN CALIFORNIA, Los Angeles, CA (US)

(72) Inventors: Ulrich Neumann, Manhattan Beach, CA (US); Suya You, Los Angeles, CA (US); Rongqi Qiu, Los Angeles, CA (US); Guan Pang, Los Angeles, CA (US); Jing Huang, Los Angeles, CA (US); Luciano Nocera, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 154 days.

(21) Appl. No.: 13/833,078

(22) Filed: Mar. 15, 2013

(65) Prior Publication Data

US 2014/0098094 A1   Apr. 10, 2014

Related U.S. Application Data

(60) Provisional application No. 61/710,270, filed on Oct. 5, 2012.

(51) Int. Cl.
  *G06K 9/00*      (2006.01)
  *G06T 17/10*    (2006.01)
(52) U.S. Cl.
  CPC ........... *G06T 17/10* (2013.01); *G06K 9/00214* (2013.01); *G06T 2210/56* (2013.01)
(58) Field of Classification Search
  None
  See application file for complete search history.

(56) References Cited

U.S. PATENT DOCUMENTS

| | | | |
|---|---|---|---|
| 7,333,653 B2 * | 2/2008 | Luo et al. | 382/165 |
| 8,520,949 B1 * | 8/2013 | Bissacco et al. | 382/190 |
| 8,605,093 B2 | 12/2013 | Fu | |
| 2005/0168460 A1 * | 8/2005 | Razdan et al. | 345/419 |
| 2011/0304619 A1 * | 12/2011 | Fu et al. | 345/420 |
| 2012/0234329 A1 * | 9/2012 | Vancraen et al. | 128/845 |
| 2013/0016913 A1 * | 1/2013 | Pham et al. | 382/197 |
| 2013/0046512 A1 * | 2/2013 | Kaufmann et al. | 703/1 |

OTHER PUBLICATIONS

Fleishman et al.; "Robust Moving Least-Squares Fitting with Sharp Features", 2005, pp. 544-552.

(Continued)

*Primary Examiner* — Ming Hon
*Assistant Examiner* — Yu-Jang Tswei
(74) *Attorney, Agent, or Firm* — Michael Best & Friedrich LLP

(57) ABSTRACT

A scene point cloud is processed and a solution to an inverse-function is determined to determine its source objects. A primitive extraction process and a part matching process are used to compute the inverse function solution. The extraction process estimates models and parameters based on evidence of cylinder and planar geometry in the scene. The matching process matches clusters of 3D points to models of parts from a library. A selected part and its associated polygon model is used to represent the point cluster. Iterations of the extraction and matching processes complete a 3D model for a complex scene made up of planes, cylinders, and complex parts from the parts library. Connecting regions between primitives and/or parts are processed to determine their existence and type. Constraints may be used to ensure a connected model and alignment of its components.

19 Claims, 7 Drawing Sheets

(56) References Cited

OTHER PUBLICATIONS

Hoope; "Surface Reconstruction from Unorganized Points", Department of Computer Science and Engineering, University of Washington, 1994, pp. 1-116.

Li et al.; "GlobFit: Consistently Fitting Primitives by Discovering Global Relations"; ACM Transactions on Graphics, vol. 30, No. 4, Article 52, Jul. 2011, pp, 1-11.

Schnabel et al.; "Efficient RANSAC for Point-Cloud Shape Detection", Computer Graphics Forum; vol. 26, No. 2, 2007, pp. 214-226.

Zhou et al.; "2.5D Dual Contouring: A Robust Approach to Creating Building Models from Aerial LiDAR Point Clouds", University of Southern California, 2010, pp. 115-128.

Tahir Rabbani Shah, "Automatic Reconstrucion of Industrial Installations using point cloud and images", 2006; pp. 1-175.

TS&E, "Simulation software Texas USA", 2012; pp. 1-3.

\* cited by examiner

THREE-DIMENSIONAL POINT PROCESSING AND MODEL GENERATION

This application claims the benefit of US Provisional Application 61/710,270, filed Oct. 5, 2012, herein incorporated by reference in its entirety.

TECHNICAL FIELD

The present invention relates to three-dimensional point processing and model generation of objects.

BACKGROUND

Computer modeling is currently a very time-consuming labor-intensive process. Many systems allow manual interaction to create surfaces and connections in an editing system (e.g., Maya, 3DS). Higher level interaction can be used to increase productivity (e.g., CloudWorx, AutoCAD), but human interaction is typically required to build a model. More recently, automatic systems have been introduced, but these have limitations on the types of structure they can model. In the case of aerial LiDAR (Light Detection And Ranging), systems have been developed to model buildings and ground terrain. Ground-based LiDAR scans can be processed to model simple geometry such as planar surfaces and pipes. A general scan, however, often contains objects that have specific shapes and function. Specifically, in industrial scans, while pipes are prevalent, their junctions may be complex, and pipes often connect to valves, pumps, tanks and instrumentation. Typical systems do not provide a capability to detect and model both simple primitive shapes such as cylinder and planar structure, as well as, general shaped objects such as valves, pumps, tanks, instrumentation and/or the interconnections between them. The creation of accurate and complex computer models may have application in the creation of three-dimensional virtual environments for training in various industries including the oil and gas industry.

SUMMARY

A method for three-dimensional point processing and model generation includes providing data including a scan of a scene comprising a point cloud, the point cloud including a plurality of points, applying a primitive extraction to the data to associate primitive shapes with points within the point cloud, applying a part matching to the data to associate points within the point cloud with one or more part models, and assembling the primitive shapes and the part models into a 3D surface model of the scene.

A system for three-dimensional point processing and model generation includes a database configured to store data comprising a scan of a scene comprising a point cloud, the point cloud comprising a plurality of points, a computer processer configured to receive the stored data from the database, and to execute software responsive to the stored data, and a software program executable on the computer processer, the software program containing computer readable software instructions including a primitive extraction module that applies primitive extraction to the data to associate primitive shapes with points within the point cloud, a part matching module that applies a part matching to the data to associate points within the point cloud with part models, and a model integration module that assembles the primitive shapes and part models into a 3D surface model of the scanned scene.

A non-transitory processor readable medium containing computer readable software instructions used for three-dimensional point processing and model generation including a primitive extraction module that applies primitive extraction to the data to associate primitive shapes with points within a point cloud, a part matching module that applies a part matching to the data to associate points within the point cloud with part models, and a model integration module that assembles the primitive shapes and part models into a 3D surface model of the scanned scene.

DETAILED DESCRIPTION

Figure 1:
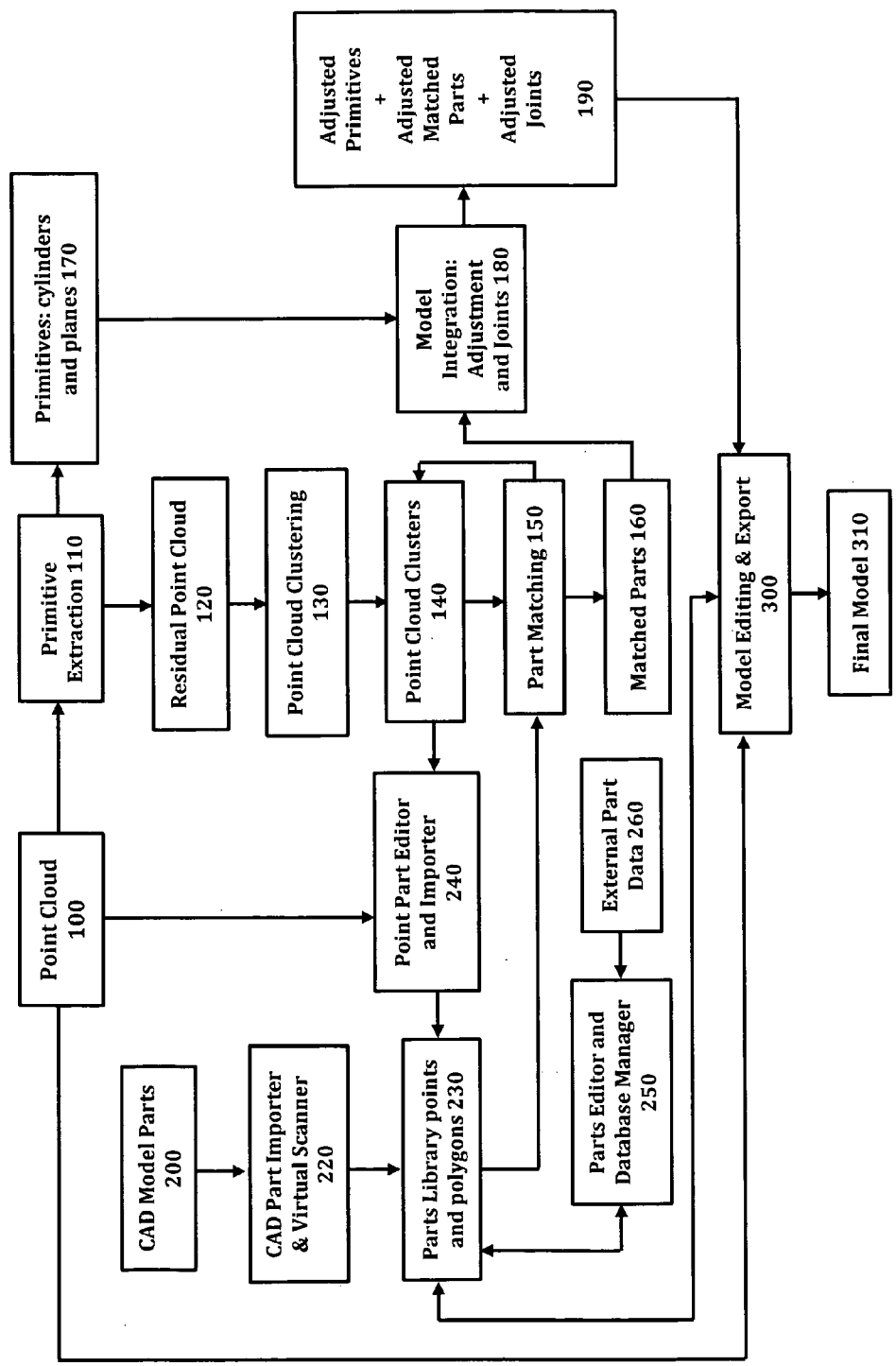
FIG. 1 shows a flow diagram of 3D point processing and 3D model construction according to an embodiment of the present invention.

Embodiments of this disclosure relate to the fields of three-dimensional (3D) point processing and 3D model construction. As will, be described, a system, method, and computer program product are disclosed for generating a 3D Computer-Aided Design (CAD) model of a scene from a 3D point cloud. As used herein, a point cloud refers to a data array of coordinates in a specified coordinate system. In a three-dimensional (3D) point cloud, the data array contains 3D coordinates. Point clouds may contain 3D coordinates of visible surface points of the scene. Point clouds obtained by any suitable methods or devices as understood by the skilled artisan may be used as input. For example, point clouds could be obtained from 3D laser scanners (e.g., LiDAR) or from image-based methods. 3D point clouds can be created from a single scan or viewpoint, or plurality of scans or viewpoints. The 3D model that is created includes 3D polygons or other mathematical 3D surface representations. In addition, the created model can contain metadata describing the modeled parts, their specific parameters or attributes, and their connectivity. Such data is normally created and contained within hand-made CAD models and their data files.

Embodiments of this disclosure process a scene point cloud and determine a solution to an inverse-function. This solution determines what objects are in the scene to create a given point cloud. As will be described, two processes may be used to compute the inverse function solution. The first is a primitive extraction process that finds evidence of cylinder and planar geometry in the scene and estimates models and parameters to fit the evidence. The second process is a part matching process that matches clusters of 3D points to 3D models of parts stored in a part library. The part located which best batches the point cloud, and that part's associated polygon model, is then used to represent the point cluster. Iterations of primitive extraction and part matching processes are invoked to complete a 3D model for a complex scene consisting of a plurality of planes, cylinders, and complex parts, such as those contained in the parts library. The connecting regions between primitives and/or parts are processed to determine the existence and type of connection joint. Constraints can be imposed on orientations and connections to ensure a fully connected model and alignment of its component primitives, parts, and joints.

Embodiments of this disclosure create a 3D CAD model of a scene from a 3D point cloud. Point clouds will contain 3D coordinates of visible surface points of the scene. Any 3D point cloud can be used as input. For example, point clouds could be obtained from 3D laser scanners (e.g., LiDAR) or from image-based methods. 3D point clouds can be created from a single scan or viewpoint, or plurality of scans or viewpoints.

Embodiments of this disclosure process a scene point cloud and determines what objects are in a scene to create a given point cloud. A primitive extraction process finds evidence of cylinder and planar geometry (e.g., primitive geometries and/or shapes) in the scene and estimates models and parameters to fit the evidence. A 3D part matching process matches clusters of points to models of parts stored in a part library to locate the best matching part and use its polygon model to represent the point cluster. Iterations of the primitive extraction and part matching processes are invoked to complete a 3D model for a complex scene consisting of a plurality of planes, cylinders, and complex parts, such as those contained in the parts library. The connecting regions between primitives and/or parts are processed to determine the existence and type of joint connection. Constraints can be imposed on positions, orientations and connections to ensure a fully connected model and alignment of its component primitives, parts, and joints.

In an embodiment, 3D points are processed as input (i.e., it is possible to proceed without use of any 2D imagery). Primitive shapes (e.g., cylinders and planes) are detected by an automated global analysis. There is no need for manual interaction, local feature detection, or fitting to key points. 3D matching methods are used to automatically match entire clusters of points to a library of parts that are potentially in the scene. The best match determines which one more part models are used to represent the cluster. By matching library parts to entire point clusters, there is no need for constructing the 3D part model by connecting or fitting surfaces to input points. In addition, all the part attributes in the part library are included with the output model.

The modeling system may contain optional components to enhance and extend its functions. For example, connectivity and constraints can be enforced and stored with the model in the final modeling stage where primitives and matched parts are connected with joints. In embodiments, a virtual scanner can accept CAD models as input and compute surface points. This allows CAD models to be imported to the matching database. In embodiments, a point part editor allows users to interactively isolate regions of a point cloud and store them in the matching database for object matching. In embodiments, a parts editor and database manager allows users to interactively browse the matching database and edit its contents. This also provides import capability from external systems with additional data about parts in the database. In embodiments, a modeling editing and export function allows users to view a model and interactively edit it using traditional edit functions such as select, copy, paste, delete, insert [e.g., Maya, 3DS, Auto-CAD] and output the model in standard formats such as Collada, KML, VRML, or AutoCAD.

FIG. 1 shows a flow diagram of 3D point processing and 3D model construction according to an embodiment. Dark shaded boxes denote data that is passed from one function to another. Light shaded boxes denote the processing functions that operate on an input data and produce an output data.

The input Point Cloud (100) may be a data array of 3D coordinates in a specified coordinate system. These points can be obtained from LiDAR or other sensor systems known to those skilled in the art. These points convey surface points in a scene. They can be presented in any file format, including Log ASCII Standard (LAS), or X,Y,Z, file formats. The coordinate system may be earth-based, such as global positioning system (GPS) or Universal Transverse Mercator (UTM), or any other system defining an origin and axes in three-space. When several scans are available, their transformations to a common coordinate system can be performed. Additional data per-point may also be available, such as intensity, color, time, etc.

Figure 2:
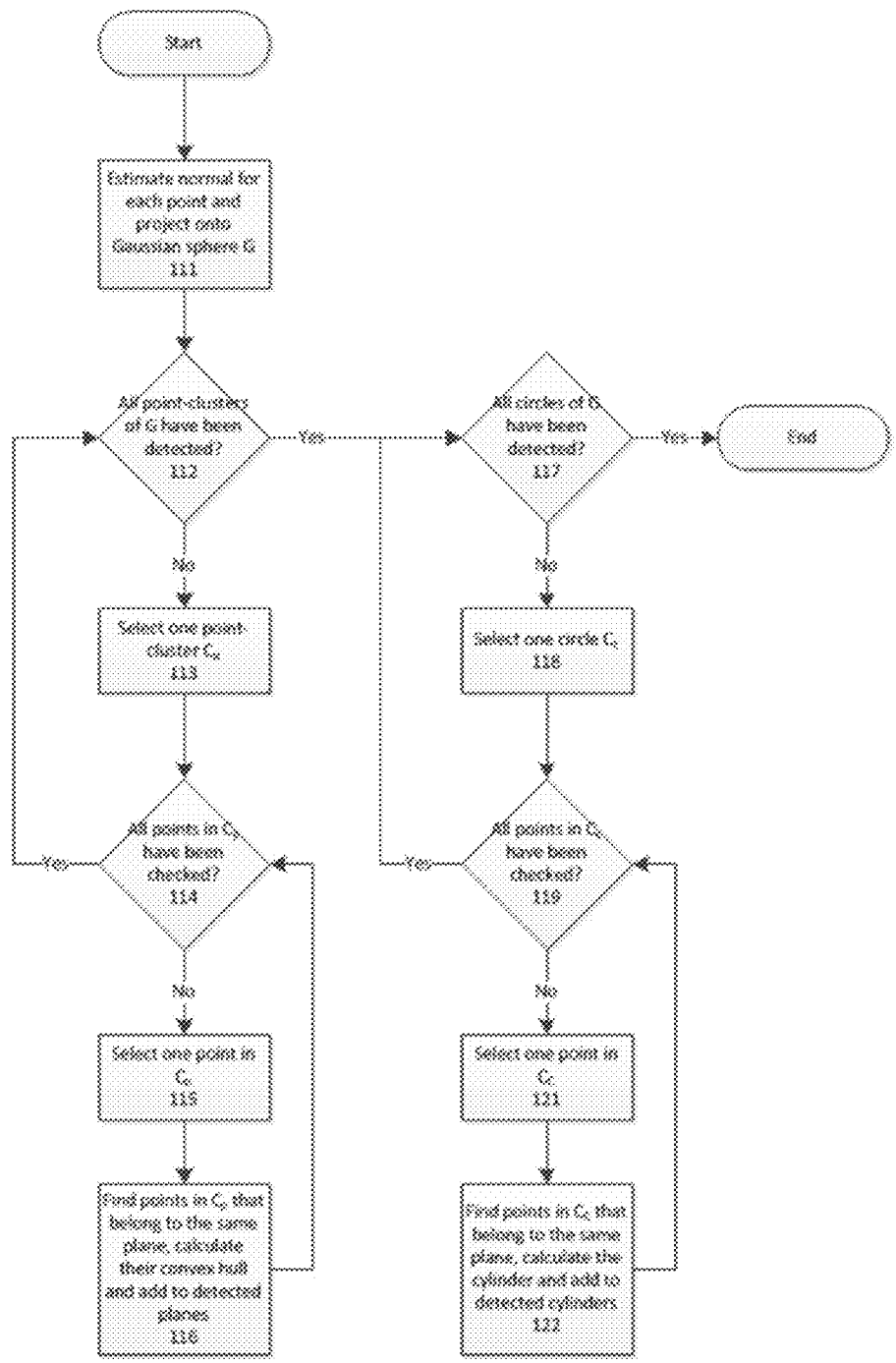
FIG. 2 shows a primitive extraction process according to an embodiment of the present invention.

Primitive Extraction (110) is the process that examines the point cloud to determine whether it contains points suggesting the presence of planes or cylinders. FIG. 2 shows an example of Primitive Extraction (110) process in detail. Normal vectors are computed for each data point. For example, this can be performed using a method such as that taught in "Pauly, M.: Point primitives for interactive modeling and processing of 3D geometry. Hartung-Gorre (2003)," which is incorporated herein by reference in its entirety. The normals are projected onto the Gaussian sphere at step (111). For example, this can be performed using a method such as that taught in "J. Chen and B. Chen. Architectural modeling from sparsely scanned range data. IJCV, 78(2-3):223-236, 2008," which is incorporated herein by reference in its entirety. Circles indicate cylinders and point-clusters indicate planar surfaces are present. Then, these two kinds of primitives are detected separately, at steps (112-116) and steps (117-119 and 121-122). A determination may be made at step (112) regarding whether all point-clusters have been detected, and if no, one of them may be picked at step (113). In an embodiment, the point-clusters can be detected by an algorithm. For example, a Mean-shift algorithm, which is taught in "Comaniciu, D., Meer, P.: Mean shift: A robust approach toward feature space analysis. Pattern Analysis and Machine Intelligence, IEEE Transactions on 24 (2002) 603-619" and incorporated herein by reference in its entirety, can be used. Each point in this cluster is examined at steps (114-116), where points belonging to the same plane are extracted and their convex hull is calculated and added to the detected planes. Cylinders may be detected in a similar manner at steps (117-119, 121-122). In an embodiment, detection of circles on the Gaussian sphere may be based on a Random Sample Consensus (RANSAC) process at step 117. The RANSAC process is taught in "Fischler, M., Bolles, R.: Random sample consensus: a paradigm for model fitting with applications to image analysis and automated cartography. Communications of the ACM 24 (1981) 381-395" and is incorporated herein by reference in its entirety. When a circle is selected at step 118, its points may be checked and all points belonging to the same cylinder may be extracted. Then, the information of the cylinder may be calculated and added to detected cylinders at step 122.

Residual Point Cloud (120) contains points that are not part of the detected Primitives. They are passed to the clustering algorithm (130) for grouping by proximity.

Figure 3:
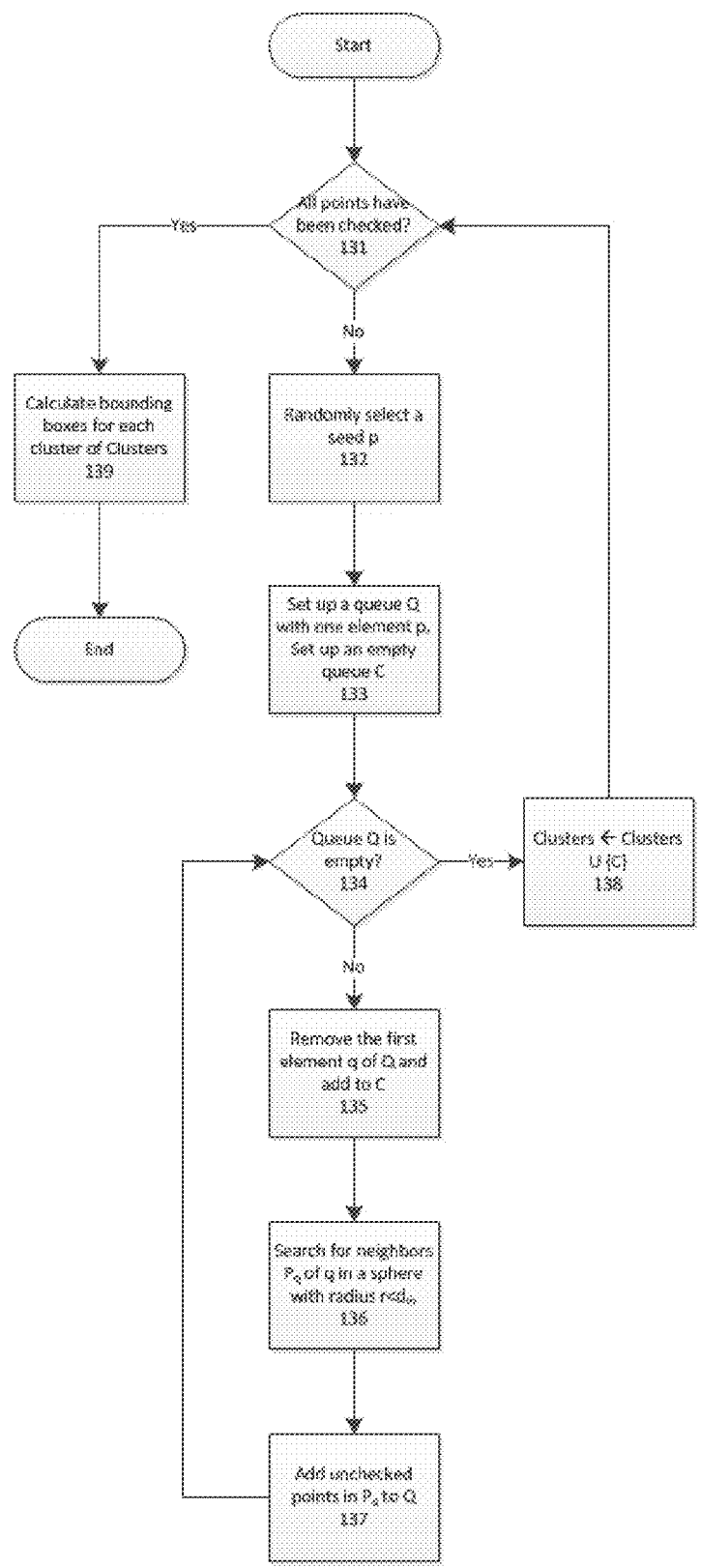
FIG. 3 shows a point cloud clustering process according to an embodiment of the present invention.

Point Cloud Clustering (130) is performed on the Residual Point Cloud (120). This process is described in FIG. 3 and it determines the membership of points to clusters. Each point is assigned to a cluster based on its proximity to other cluster members. For example, this process determines the membership of points to clusters and can be based on "R, B. Rusu, "Semantic 3D Object Maps for Everyday Manipulation in Human Living Environments," Ph.D. dissertation, Computer Science department, Technische Universit"at M"unchen, Germany, October 2009," which is incorporated herein by reference in its entirety. Each point is assigned to a cluster based on its proximity to other cluster members. Specifically, two points with Euclidean distance smaller than the threshold $d_{th}$ will be assigned to the same cluster. The process starts with step (131) where a determination is made regarding whether all points have been checked. As long as not all points are visited, one of the unvisited points is randomly selected as the seed (denoted as p) at step (132). The process of finding a cluster from the seed p is called the flood-fill algorithm, which begins at step (133), where a queue (denoted as Q) is set up with the only element p. Another empty queue (denoted as C) is also set up to keep track of the detected cluster. A determination is made on whether Q is empty at step (134). As long as Q is not empty, the cluster C can be expanded. The first element of Q (denoted as q) is removed from Q and added to C at step (135). Next, neighbors of q (denoted as $P_q$) in a sphere with radius $r<d_{th}$ is searched at step (136), and all the unchecked points in $P_q$ are added to Q at step (137) and are simultaneously marked as "checked". This process is iterated until Q is empty, where a cluster C is said to be found and added to the set Clusters, at step (138). After all the points are checked, all the clusters are found and each point is assigned to exactly one cluster. These clusters, as well as their associated bounding boxes calculated at step (139), are output as Point Cloud Clusters (140).

Point Cloud Clusters (140) are sets of points that form clusters based on their proximity. Each cluster of points has an associated bounding box. For example, a pump may be in line with two pipes. Once the pipes are discovered and modeled in the Primitive Extraction (110) process, the pipe points are removed, leaving the Residual Point Cloud (120) with only the points on the pump surface. The Point Cloud Clustering (130) process discovers that these points are proximate to each other and groups them into a cluster with a bounding box. The bounded cluster of pump points is added to the Point Cloud Cluster (140) data. Depending on the scanned scene, there may be zero, one, or many clusters in the Point Cloud Cluster (140) data.

Part Matching (150) can be implemented in many ways. Two methods that can be used are described below; however, one skilled in the art will appreciate that other methods or variations of these methods are possible. In one embodiment according to a first method of matching, an entire part in the Parts Library (230) to a region in the point cloud using a classifier. The method makes use of the Parts Library (230), and when a suitable match is found the matched-points are removed from the Point Cloud Clusters (140). The output of Matched Parts (160) is a 3D surface part model in a suitable representation such as polygons or non-uniform rational basis splines (NURBS) along with their location and orientation in the model coordinate system.

Figure 4:
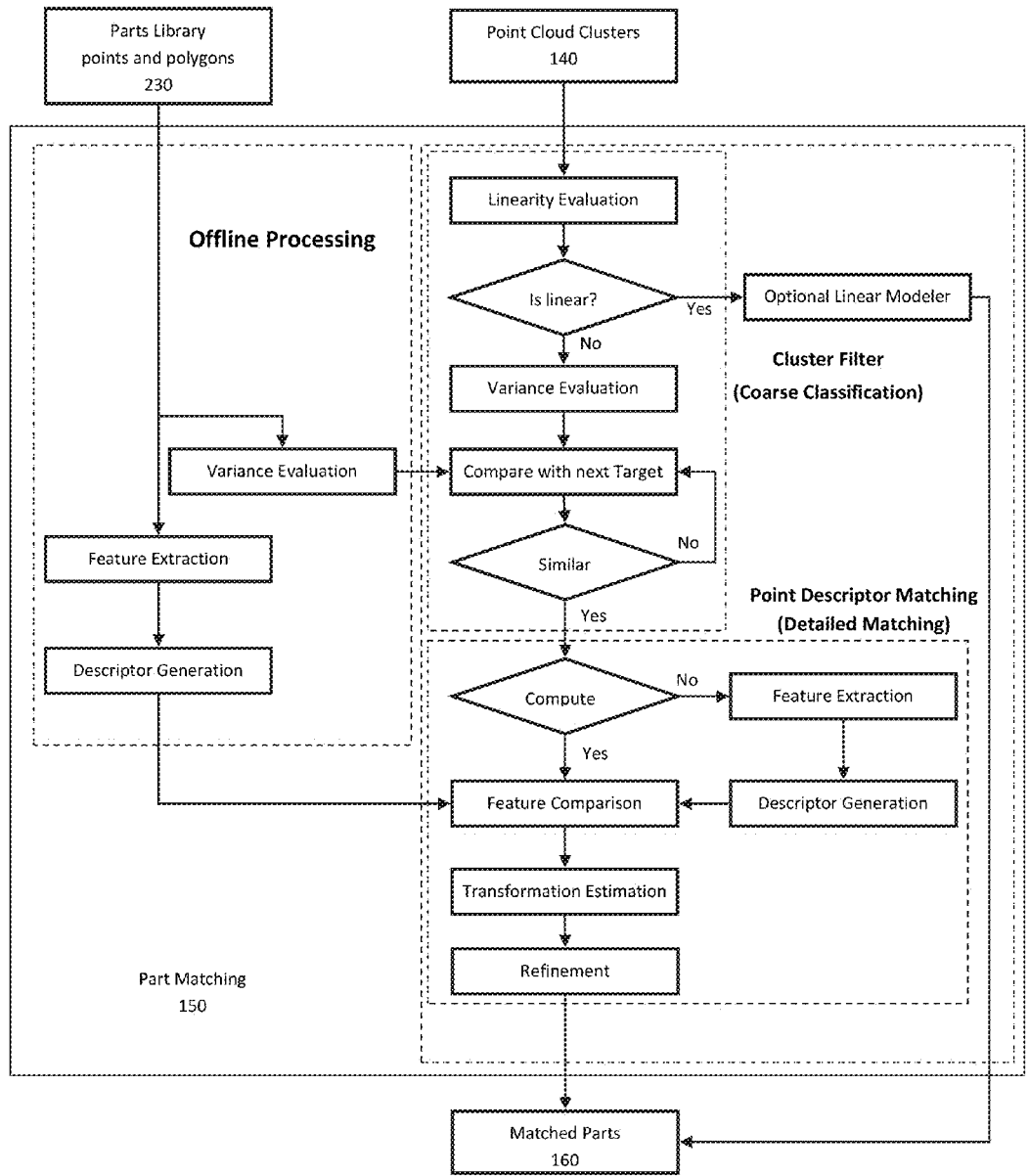
FIG. 4 shows a part matching process based on a classifier according to an embodiment of the present invention.

A classifier-based implementation of Part Matching (150) is described here and shown in FIG. 4. The inputs to the Part Matching process are the Point Cloud Clusters (140), which contain points that were not identified as primitive shapes (cylinders or planes) during earlier processing. The Parts Library (230) data includes a polygon model and a corresponding point cloud for each part. The coordinate axes of the polygon models and point clouds are the same, or a transformation between them is known.

Each library part in the Part Library (230) has a part detector (151) obtained from a training module (152). The detector consists of N weak classifier $c_i$ (default N=20), each with a weight $\alpha_i$. Each weak classifier evaluates a candidate part (point clouds within the current search window), and returns a binary decision (1 if it's identified as positive, 0 if not). Each weak classifier is based on a Haar feature, such as taught in "P. Viola and M. Jones. Rapid Object Detection using a Boosted Cascade of Simple Features. Proceedings of CVPR, 1: I-511-I-518, 2001" and incorporated herein by reference in its entirety, whose value is the sum of pixels in half the region minus the sum in the other half. In two dimensions, a Haar feature may be used to extract an object's boundary, as that is the portion that tends to be distinctive in an object. Similarly, 3D Haar-like features may extract three dimensional object boundaries. Alternately, a set of binary occupancy features may be used instead of Haar-like features. The method may generally be applied to a variety of more or less complex local features with success.

The final part detector (151), or strong classifier, is a combination of all weighted weak classifiers, producing an evaluation of the candidate part as $\Sigma_i \alpha_i c_i$. The weighted sum is then compared to a predetermined threshold t (=0.5 $\Sigma_i \alpha_i$ by default) to determine whether the candidate part is a positive match. The threshold test $\Sigma_i \alpha_i c_i - t$ is also used to estimate a detection confidence.

Pre-processing (153) may be employed before training the classifier. The candidate point cloud may first be converted to volumetric data or a 3D image of voxels. Each voxel in the converted 3D image corresponds to a grid-like subset of the original point cloud. The intensity value of each voxel equals the number of points within it, and coordinate information of each point may be discarded. To smooth any bordering effect due to the grid conversion, each point in the point cloud may be made to contribute to more than one voxel through interpolation (e.g., linear interpolation). In one embodiment, each grid may be set to approximately 1/100 of the average object size. As will be appreciated, the grid size may be increased or decreased depending on the particular application. The 3D image is further processed as a 3D integral image, also known as a summed-area table, which is used to the compute sum of values in a rectangular subset of voxels in constant time. An example of summed-area tables are taught in "F. Crow. Summed-area tables for texture mapping. Proceedings of SIGGRAPH, 18(3): 207-212, 1984," which is incorporated herein by reference in its entirety.

In an embodiment, the 3D integral image is made up of 3D rectangular features, such as Haar-like features. As known to those of skill in the art, Haar-like features, which in this context may be features in which a feature value is a normalized difference between the sum of voxels in a bright area and a sum of voxels in a shaded area. In this approach, the integral image at a location x, y, z contains the sum of the voxels with coordinates no more than x, y, z inclusive.

$$ii(x,y,z) \Sigma_{x' \leq x, y' \leq y, z' \leq z} i(x,y,z) \qquad \text{(Eqn. 1)}$$

where ii(x,y,z) is the 3D integral image and i(x,y,z) is the original 3D image.

A set of recursive equations may be defined:

$$s(x,y,z)=s(x,y,z-1)+i(x,y,z) \qquad \text{(Eqn. 2)}$$

$$ss(x,y,z)=ss(x,y-1,z)+s(x,y,z) \qquad \text{(Eqn. 3)}$$

$$ii(x,y,z)=ii(x-1,y,z)+ss(x,y,z) \qquad \text{(Eqn. 4)}$$

where s(x,y,z) and ss(x,y,z) are the cumulative sums s(x, y, −1)=0, ss(x−1, z)=0, it(−1, y, z)=0. On the basis of these, the 3D integral image may be computed in one pass over the original 3D image. Any two 3D Haar-like features defined at two adjacent rectangular regions may, in general, be computed using twelve array references.

The training phase can use a machine learning training framework (155), such as an AdaBoost algorithm. For example, AdaBoost, short for Adaptive Boosting, training is taught in "Y. Freund, R. E. Schapire. A Decision-Theoretic Generalization of on-Line Learning and an Application to Boosting, Computational Learning Theory: Eurocolt, pp. 23-37, 1995," which is incorporated herein by reference in its entirety. The input positive training samples (156) are produced from library parts (either scanned point clouds or from a virtual scanner), by random down-sampling with option of additional noise and occlusions. Negative input samples (156) are produced from negative point cloud regions (region without the target part), by randomly sampling a subset with the size of the target part.

Each training sample (positive or negative) is assigned a weight (the same in the beginning), and pre-processed by 3D image conversion and integral image computation. A target number of weak classifiers (default=20) is processed and trained one by one in each cycle. Firstly, a pool of candidate weak classifiers is randomly generated (within the bounding box determined by the target part). The best parameters for all candidate weak classifiers (optimal threshold minimizing the weighted classification error) are trained based on the samples and their current weights. The candidate weak classifier with the minimum weighted error is selected as the weak classifier for this cycle. The weight of the weak classifier is computed based on the weighted error. The samples are reweighted—lowering the weight if a sample is correctly identified by the selected weak classifier. Then all weights are normalized.

The Detection Module (154) input comes from the Point Cloud Clusters (140). The clusters are pre-processed (153) as described above into a 3D Integral Image for efficient processing. A 3D detection window is moved to search across each of the clusters, evaluating the match between each subset of a cluster point cloud and a candidate part in the Parts Library (230).

For each library part in the Part Library (230), the Part Matching (150) process searches within each Point Cloud Cluster (140) for a match using the corresponding part detector (151). An evaluation window for each library part is positioned on a 3D search grid of locations in the Point Cloud Cluster (140). The search grid locations are established by computing a 3D image or voxel array that enumerates the points with each voxel. Each window position within the Point Cloud Cluster (140) is evaluated as a candidate part match to the current library part. To cope with potential orientation changes of a part, a principle direction detector is applied at each window position before match evaluation. The detected direction is used to align the candidate part to the same orientation as the library part.

The candidate part is evaluated by the Part Detector (151). This process uses multiple weak classifiers, combines their scores with weight factors, and compares the result to a threshold and produces a confidence score.

After all library parts are evaluated, all detected positive match instances are further processed by non-maximum suppression, to identify the library part with the best match and confidence above a threshold. If a best-match with a confidence above threshold exists, the best match part is output as a Matched Part (160) for integration into the final model. The points corresponding to the best match part are removed from the cluster.

The Point Cloud Cluster (140) is considered to be fully processed when the number of remaining points in the Point Cloud Cluster falls below a threshold % (e.g., 1%) of the number of initial cluster points. If all library parts in the Part Library (230) have been searched for in the cluster and successful matches do not remove enough points to consider the cluster fully processed, the remaining points are left in the Point Cloud Cluster (140) for later visualization during Model Editing & Export (300) or manual part creation with the Point Part Editor (240), which allows unmatched parts to be added to the Part Library (230) for use in subsequent processing.

The output of Part Matching (150) is the Matched Parts (160) list including their surface representations and transformation matrices, along with any metadata stored with the part in the Part Library (230).

Figure 5:
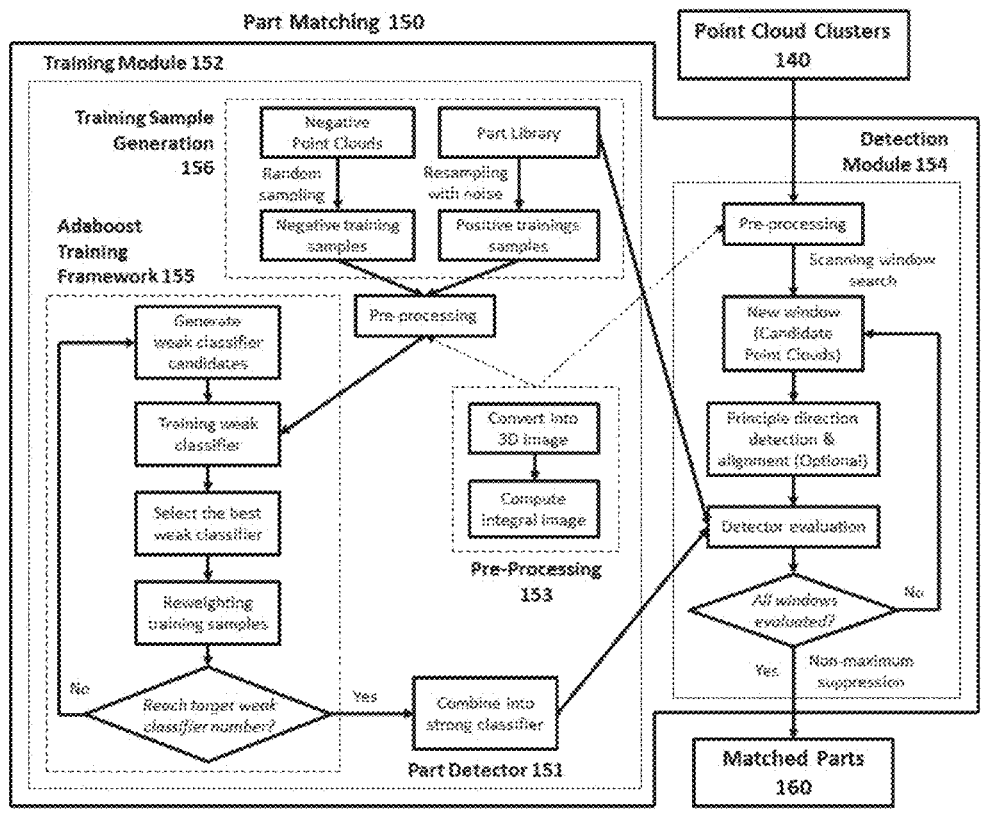
FIG. 5 shows a part matching process based on feature detection according to an embodiment of the present invention.

FIG. 5 illustrates an alternate method of Part Matching (150). This method finds local features in the point cloud data. A multi-dimensional descriptor encodes the properties of each feature. A matching process determines the similarity of feature descriptors in the Parts Library (230) to feature descriptors the point cloud. The best set of feature matches that meet a rigid body constraint are taken as a part match and the matched-points are removed from the Point Cloud Clusters (140). The output of Matched Parts (160) is a 3D surface part model in a suitable representation such as polygons or NURBS along with their location and orientation in the model coordinate system.

The inputs of the FIG. 5 Part Matching (150) process are the Point Cloud Clusters (140). Given a CAD Model (200) of a part, an offline process may be used to create a corresponding point cloud model data in the Parts Library (230). The CAD Model (200) is imported and converted to a point cloud by a Virtual Scanner (220). The virtual scanner simulates the way a real scanner works, using a Z-buffer scan conversion and back-projection to eliminate points on hidden or internal surfaces. Z-buffer scan conversion is taught, for example, in "Straßer, Wolfgang. Schnelle Kurven-und Flächendarstellung auf graphischen Sichtgeräten, Dissertation, TU Berlin, submitted 26.4.1974," which is incorporated herein by reference in its entirety.

In an embodiment, the Part Library (230) point cloud models may be pre-processed to detect features and store their representations for efficient matching. The same feature detection and representation calculations are applied to the input Point Cloud Clusters (140), as shown in FIG. 5. The variances, features, and descriptors of the point clouds are computed. The Variance Evaluation follows the definition of variance of 3D points. The Feature Extraction process detects salient features with a multi-scale detector, where 3D peaks of local maxima of principle curvature are detected in both scale-space and spatial-space. Examples of feature extraction methods are taught in "D. G. Lowe. Object Recognition from Local Scale-Invariant Features. In Proceedings of the 7th International Conference on Computer Vision, 1999" and "A. Mian, M. Bennamoun, R. Owens. On the Repeatability and Quality of Keypoints for Local Feature-based 3D Object Retrieval from Cluttered Scenes. IJCV 2009," which are both incorporated herein by reference in its entirety.

Given an interest point and its local region, there are two major steps to construct the descriptor. Firstly, the self-similarity surface is generated using the similarity measurements across the local region, where the similarity measurements can be the normal similarity, or the average angle between the normals in the pair of regions normalized in the range of 0-1. Then, the self-similarity surface is quantized along log-spherical coordinates to form the 3D self-similarity descriptor in a rotation-invariant manner. The self-similarity surface is the 3D extension of the 2D self-similarity surface, which is described in "E. Shechtman and M. Irani, Matching Local Self-Similarities across Images and Videos. Computer Vision and Pattern Recognition, 2007," which is incorporated herein by reference in its entirety. The normal and curvature estimation are provided by open-source libraries such as a Point Cloud Library (PCL), an example of which is described in "R. B. Rusu and S. Cousins. 3D is here: Point Cloud Library (PCL). In Proceedings of the IEEE International Conference on Robotics and Automation (ICRA '11), Shanghai, China, May 2011," which is incorporated herein by reference in its entirety.

The output of the Descriptor Generation is the feature representation with point descriptors of a cluster containing a group of feature points (x, y, z coordinates and the detected scale), each of which is assigned with a point descriptor i.e. a 5*5*5=125 dimensional vector.

During online processing, the input clusters are first passed through the sub-module of Cluster Filter (Coarse Classification). The Cluster Filter consists of several filters that rule out or set aside clusters with or without certain significant characteristic. The filters are extremely fast while able to filter out quite a number of impossible candidates. Our implementation uses two filters: linearity filter and variance filter.

The linearity filter is independent of the query target (from the part library). The linearity is evaluated by the absolute value of the correlation coefficient r in the Least Squares Fitting on the 2D points of the three projections. An example of Least Squares Fitting is taught by Weinstein, Eric W. "Least Squares Fitting." From. MathWorld—A Wolfram Web Resource, which is incorporated herein by reference in its entirety. If tri is above a threshold in one of the projections, the cluster is considered as a 'linear' cluster, Note that planes and cylinders may fall in the linear category, but since both have been detected in the Primitive Extraction (110) step, any remaining linear clusters are considered missed primitives or noise. Linear clusters may be ignored or an optional least-square fitting process may be used as a Linear Modeler to approximate the cluster with polygon surfaces.

The variance filter is partially dependent on the target. If the variances of the points between the candidate cluster and the target are very much different from each other, the candidate would be unlikely to be matched to the target, thus would not be passed on to the point descriptor matching process.

During Point Descriptor Matching (Detailed Matching), the descriptors for the targets generated in the offline processing are compared against the descriptors for the candidate clusters generated during the online processing and the transformation is estimated if possible. Note that the features and the descriptors will not be computed twice for efficiency.

One step in the matching process may be a Feature Comparison, the process of comparing the feature representations with point descriptors between the candidate clusters and part library targets. Initially all nearest-neighbor correspondences, or pairs of features, with any Nearest Neighbor Distance Ratio (NNDR) value are computed and then, a greedy filtering strategy is used to look for the top four correspondences that fit the distance constraint. "K. Mikolajczyk and C. Schmid. A Performance Evaluation of Local Descriptors. IEEE Transactions on Pattern Analysis and Machine Intelligence, vol. 27, no. 10, pp. 1615-1630, October 2005," which is incorporated herein by reference in its entirety, evaluates various point descriptors. The number of remaining correspondences that fit the hypothesis may be used as the matching score. If the matching score between a cluster and a target is higher than some threshold, the cluster is considered to be an instance of the target, or they are said to be matched to each other. The output of Feature Comparison are the combined correspondences i.e., the correspondences, fitting the distance constraints, between the candidate cluster and the target that are considered matched.

The final steps, the Transformation Estimation and the Refinement are processes of estimating the transformation and refinement between the candidate cluster and the target, based on the combined correspondences. Specifically, a 3*3 affine transformation matrix and a 3D translation vector is solved from the equations formed by the correspondences. A rigid-body constraint may be used to refine the result through Gram-Schmidt Orthogonalization. An example of Gram-Schmidt Orthogonalization is taught by Weisstein, Eric W. "Gram-Schmidt Orthogonalization." From MathWorld-A Wolfram Web Resource, which is incorporated herein by reference in its entirety. These parameters may be used to transform the polygon model in the part library to Matched Parts that could fit in the scene model.

Referring back to FIG. 1, Matched Parts (160) are 3D CAD models that were determined to be in the Point Cloud Clusters (140). The Matched Parts (160) data identifies the CAD models that were discovered within the point cloud as well as the meta-data for those models. These CAD models have a suitable surface representation such as polygons or Bezier patches or NURBS, including their locations and orientations within the point cloud. Related information about each CAD model is stored in the Parts Library (230), including connector information, which is utilized in Model Integration (180).

Primitives (170) are the cylinders and planes extracted by the Primitive Extraction (110) process. These are CAD models with a suitable surface representation such as polygons or Bezier patches or NURBS, including their locations and orientations within the point cloud.

Figure 6:
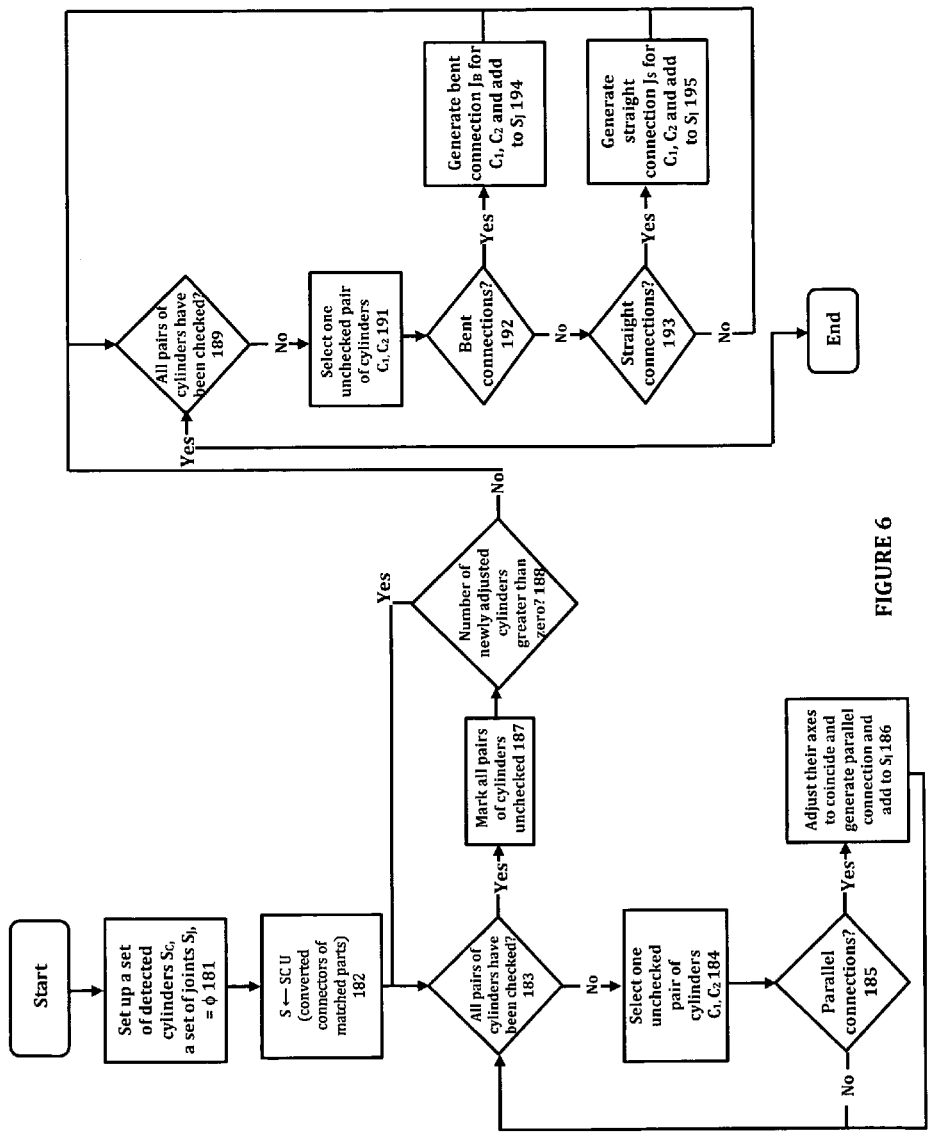
FIG. 6 shows a model integration adjustment and joints process according to an embodiment of the present invention.

FIG. 6 illustrates an example process for Model Integration (180), which takes Detected Primitives (170) and Matched Parts (160) as inputs. This process adjusts the positions of primitives and parts in a local scope in order to connect them. It also generates joints between primitives and/or parts. This process starts with setting up a set of detected cylinders (denoted as $S_C$) and a set of generated joints (denoted as $S_J$) at step (181). Connectors associated with each matched part are converted into virtual cylinders at step (182), which are zero-length cylinders indicating their expected connection to other primitives.

The process of joint generation may be composed of two parts. One is a parallel connection, as shown in steps (183-188), which adjusts positions and generates joints of parallel cylinders. The other is non-parallel connection, shown as steps (189, 191-195), which generates bent and straight joints for non-parallel cylinders.

A parallel connection begins with a determination at step (183) regarding whether all pairs of cylinders have been checked. If not, one is them (denoted as $c_1, c_2$) is selected at step (184). A parallel connection is needed between $c_1$ and $c_2$ if step (185) determines that their end-to-end distance is below a threshold and their axes are parallel within a threshold angle. If these cases are met, their axes are adjusted to coincide exactly and a parallel connection is generated at step (186). The process of checking every pair of cylinders is performed iteratively, until no more cylinders are adjusted at step (188). Next, non-parallel connections are generated in a similar manner at steps (189, 191-195), with the difference that no iterations are needed at this stage.

Adjusted Model (190) is the result of all the automatic processing of Primitives and Parts and Joints. The data at this stage includes CAD surface models with a suitable surface representation such as polygons or Bezier patches or NURBS, including their locations and orientations with respect to a common coordinate system. The point cloud coordinate system is suitable, but not the only possible coordinate system that could be used for the model. The model at this stage also includes the connectivity information that was produced in the Model Integration (180) stage. Connectivity data records the physical connections between Primitives, Parts, and Joints. Such data can be used to determine flow paths through pipes and valves and joints, for example.

CAD Model Parts (200) may be 3D part models obtained from outside sources. For example, a valve vendor may provide a CAD model of the valves they sell. This 3D model can be added to the Parts Library (230) for matching to Point Cloud (100) data. 3D models may be in varied data formats such as Maya, IML, Autocad, 3DS or others. The Model data may represent the Part surfaces as polygons or Bezier patches or NURBS, defined within a local coordinate system.

CAD Part Importer & Virtual Scanner (220) inputs varied CAD Model Parts (200) formats and converts them to the point and polygon representation used in the Parts Library (230). This may be an automatic or manually-guided process. It need only be performed once for any specific CAD model. This process may also convert CAD Model (200) coordinates to a standard coordinate system, units, and orientation used within the Parts Library (230). The input CAD Model (200) is a surface representation. The Parts Library (230) has both a surface representation and a point cloud representation for each part. The CAD Model (200) surface is processed by a Virtual Scanner (220) to simulate the scan of the part. The Virtual Scanner (200) may perform scans at varied resolution (point density) and from varied viewpoints to obtain a complete point cloud for the CAD Model (200). A Z-buffer scan conversion [Sir] and back-projection are used to eliminate points on hidden or internal surfaces of the model. Hidden internal surfaces would never be seen by an actual scan of the object in use. For example, the interior of a valve flange would not appear in an actual scan since the flange would be connected to a pipe or other object in actual use.

Parts Library (230) contains the surface and point cloud models for all parts to be matched in the modeling process. The parts are stored in a defined coordinate system, units, and orientation. The Part Matching (150) process can use either or both the surface and point cloud models for the matching and modeling process.

The models in the Parts Library (230) may be obtained from two sources. The CAD Part Importer (220) allows CAD surface models to be processed for inclusion in the library. The Point Part Editor and Importer (240) allows the actual scanned points of an object to be included as parts in the library. This means surface models and scanned point clouds can become parts in the Parts Library (230). Any part in the library can be accessed for Part Matching (150). Pre processing of the parts in the library may be done to facilitate the Part Matching (150) process. Pre processing may result in additional data that is stored for each part and accessed during Part Matching (150).

The library also contains connector information for each Part, which indicates its interface type and area(s) of connection to other cylinders or Parts. Specifically, the connector information contains positions, orientations and radii or geometry of the connecting surfaces. This information is usually obtained by manually marking the Part data with the Part Editor (250), or it can be obtained as External Part Data (260).

The library may contain additional meta-data for each Part, such as manufacturer, specifications, cost or maintenance data. The meta-data is obtained from Externals Part Data (260) sources such as manufacturer's spec sheets or operations data. A manual or automatic process in the Parts Editor and Database Manager (250) is used to facilitate the inclusion of External Part Data (260) or manually entered data for parts within the Parts Library (230).

Point Part Editor and Importer (240) allows construction of parts for the Parts Library (230) from actual scanned data. The Point Part Editor and Importer (240) provides the interactive tools needed for selecting regions of points within a Point Cloud (100) or Point Cloud Clusters (140). The selected points are manually or semi-automatically identified by selecting and cropping operations, similar to those used in 2D and 3D editing programs. Once the points corresponding to the desired object are isolated, they are imported into the Parts Library (230) for Part Matching (150). The Point Part Editor (240) also includes manually-guided surface modeling tools such as polygon or patch placement tools found in common 3D editing programs. The surface editing tools are used to construct a surface representation of the isolated points that define the imported part. The surface representation is also included in the Parts Library (230) model of the part.

Parts Editor and Database Manager (250) allows for interactive browsing of the Parts Library data, as well as interactive editing of metadata stored with the parts in the Parts Library (230). In addition to editing metadata, External Part Data (260) may be imported from sources such as data sheets or catalogs, or manually entered.

External Part Data (260) is any source of data about parts that are stored in the Parts Library (230) for Part Matching (150). These sources may be catalogs, specification sheets, online archives, maintenance logs, or any source of data of interest about the parts in the library. These data are imported by the Parts Editor and Database Manager (250) for storage and association with parts in the Parts Library (230).

Model Editing & Export (300) allows for viewing and interactive editing of the Adjusted Model (190) created by Model Integration (180), The Model Editing (300) capabilities are provided by a standard editing tool suite provided by commercial tools such as Maya, AutoCAD, and 3DS. In fact, such commercial tools already provide the Model Editing & Export (300) functions, so they can be used for this purpose rather than constructing a new module. At the operator's discretion, any element of the Adjusted Model (190) can be edited, replaced, or new elements can be added. The surface models in the Parts Library (230) may be used to add or replace portions of the model. For comparison to the initial Point Cloud (100), the points can also be displayed to allow manual verification of the surface model's accuracy and to guide any edits the operator deems desirable.

Once the operator deems the model to be correct, it may be exported in one or more suitable formats as the Final Model (310). These are all common features of commercial modeling software such as Maya, AutoCAD, and 3DS. As such, no further description is provided of this function. In the absence of the automatic methods, the entire model would generally have to be constructed with this module.

In addition to the model editing described above, the Model Editing & Export (300) module also read the connectivity information of the Adjusted Model (190) and the meta-data for each matched part in the model, from the Parts Library (230). Both of these data are output as part of the Final Model (310).

Final Model (310) is the completed surface model. The 3D models may be in varied data formats such as Maya, KML, Autocad, 3DS or others. The Final Model data represents surfaces by polygons or Bezier patches or NURBS, defined within a local coordinate system. The Final Model also includes connectivity information discovered and stored in the Adjusted Model (190) and parts metadata associated with the matched parts in the Parts Library (230).

Figure 7:
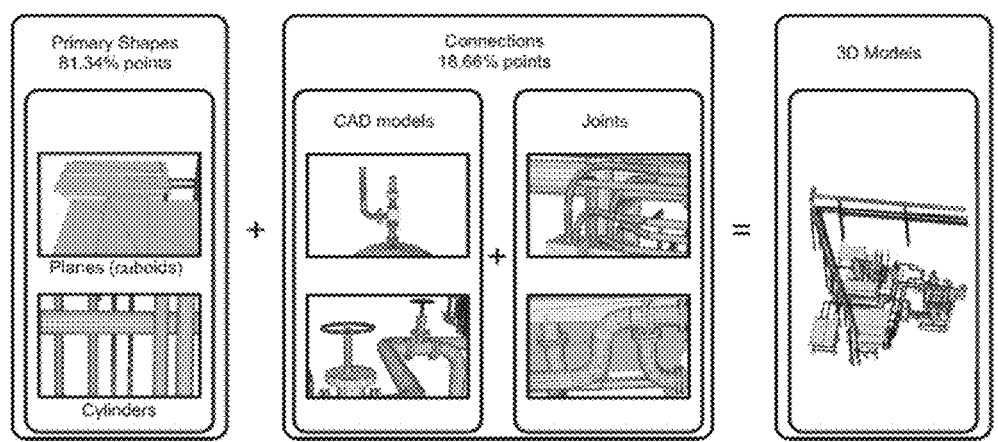
FIG. 7 shows an example case of an industrial site scan.

FIG. 7 shows an example case of an industrial site scan. Primitive Extraction accounts for 81% of the LiDAR points, while Part Matching and Joints account for the remaining 19% of the points. The result is a complete 3D polygon model composed of Primitives, Parts, and Joints.

In an embodiment, a false alarm reduction algorithm may be included. In this approach, false detections are used as additional negative training samples to retrain the detector. False detections used for retraining may be detected from negative scenes that are known and/or chosen specifically because they lack the target object. The retraining may be iterated to further reduce false detections.

Accordingly, embodiments include modeling systems and methods, which may automatically create CAD models based on a LiDAR (Light Detection and Ranging) point cloud, and automates the creation of 3D geometry surfaces and texture maps from aerial and ground scan data. In particular, this system utilizes a robust method of generating triangle meshes from large-scale noisy point clouds. This approach exploits global information by projecting normals onto Gaussian spheres and detecting specific patterns. This approach improves the robustness of output models and resistance to noise in point clouds by clustering primitives into several groups and aligning them to be parallel within groups. Joints are generated automatically to make the models crack-free.

The above described methods can be implemented in the general context of instructions executed by a computer. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the above described methods may be practiced using any one or a combination of computer processing system configurations, including, but not limited to, single and multi-processer systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention. For example, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory.

What is claimed is:

1. A method for three-dimensional point processing and model generation to be processed by computer, comprising, in the following order:
   (a) providing data comprising a scan of a scene comprising a point cloud, the point cloud comprising a plurality of points;
   (b) applying a primitive extraction to the data to associate primitive shapes with points within the point cloud
   (c) removing points that are associated with the primitive shapes to create a reduced point cloud;
   (d) cluster filtering the reduced point cloud using a linearity filter and a variance filter to produce a filtered reduced point cloud;
   (e) applying a part matching to the data to associate point within the filtered reduced point cloud with one or more part models from a library of part models, each part model in the library corresponding to a generally-shaped object potentially present in the scene, wherein the part matching includes using at least one of classifier-based matching applied to respective clusters of points in the point cloud or descriptor-based matching using self-similarity-based descriptors for local regions of the clusters of points in the point cloud; and
   (f) assembling the primitive shapes and the part models into a 3D surface model of the scene.

2. The method of claim 1, further comprising creating joints between the primitive shapes and part models prior to assembling the 3D surface model of the scanned scene, wherein the creating joints comprises determining whether potential joints correspond to parallel or non-parallel connections, and selecting a joint type from parallel joint, bent joint, and straight joint types.

3. The method of claim 2, wherein the 3D surface model of the scanned scene comprises connectivity information for at least one joint.

4. The method of claim 2, further comprising determining whether an adjustment to an axis of an object to be joined is required, and applying the adjustment where required.

5. The method of claim 1, further comprising pre-processing the point cloud scan into a 3D image.

6. The method of claim 5, wherein the pre-processing comprises:
converting the point cloud to a 3D image of voxels, each voxel corresponding to a subset volume of the point cloud; and
assigning an intensity value to each voxel based on a number of points within the voxel.

7. The method of claim 6, wherein each subset volume is equal to a selected proportion of a volume of the point cloud.

8. The method of claim 1, wherein assembling the primitive shapes and part models into the 3D surface model of the scanned scene further comprises model adjustment to meet desired geometric constraints.

9. The method of claim 1, wherein metadata for one or more of the part models is provided in the 3D surface model of the scanned scene.

10. The method of claim 1, wherein the 3D surface model of the scanned scene comprises connectivity information for at least one primitive shape.

11. The method of claim 1, wherein the 3D surface model of the scanned scene comprises connectivity information for at least one part model.

12. The method of claim 1, further comprising importing part models from 3D surface models into the parts library using a virtual scanner.

13. The method of claim 12, further comprising selecting points on a surface of a scanned part and creating a corresponding surface model that is stored in the parts library.

14. The method of claim 1, wherein the applying a part matching comprises using a training module trained using a machine learning algorithm.

15. The method of claim 14, wherein the machine learning algorithm is an adaboost training procedure.

16. The method of claim 14, wherein the machine learning algorithm comprises using negative training samples known to lack a target object to reduce false detections.

17. The method as in claim 1, wherein the primitive shapes correspond to regions within the point cloud having normals that map to points or circles and wherein the primitive shapes comprise planes or cylinders.

18. A system for three-dimensional point processing and model generation, the system comprising:

a database configured to store data comprising a scan of a scene comprising a point cloud, the point cloud comprising a plurality of points;
a computer processor configured to receive the stored data from the database, and to execute software responsive to the stored data; and
a software program executable on the computer processor, the software program containing computer readable software instructions comprising instructions for performing, in the following order:
  (a) applying primitive extraction to the data to associate primitive shapes with points within the point cloud;
  (b) removing points that are associated with the primitive shapes to create a reduced point cloud;
  (c) cluster filtering the reduced point cloud using a linearity filter and a variance filter to produce a filtered reduced point cloud;
  (d) applying a part matching to the data to associate points within the filtered reduced point cloud with one or more part models from a library of part models, each part model in the library corresponding to a generally-shaped object potentially present in the scene, wherein the part matching includes using at least one of classifier-based matching applied to respective clusters of points in the point cloud or descriptor-based matching using self-similarity-based descriptors for local regions of the clusters of points in the point cloud; and
  (e) assembling the primitive shapes and the part models into a 3D surface model of the scene.

19. A non-transitory processor readable medium containing computer readable software instructions used for three-dimensional point processing and model generation, the software instructions comprising instructions for performing, in the following order:
  (a) applying primitive extraction to the data to associate primitive shapes with points within a scan of a scene comprising a point cloud;
  (b) removing points that are associated with the primitive shapes to create a reduced point cloud;
  (c) cluster filtering the reduced point cloud using a linearity filter and a variance filter to produce a filtered reduced point cloud;
  (d) applying a part matching to the data to associate points within the filtered reduced point cloud with one or more part models from a library of part models, each part model in the library corresponding to a generally-shaped object potentially present in the scene, wherein the part matching includes using at least one of classifier-based matching applied to respective clusters of points in the point cloud or descriptor-based matching using self-similarity-based descriptors for local regions of the clusters of points in the point cloud,
  (e) assembling the primitive shapes and the part models into a 3D surface model of the scene.

* * * * *